United States Patent
Nakata et al.

(10) Patent No.: US 8,759,654 B2
(45) Date of Patent: Jun. 24, 2014

(54) ADJUSTMENT DEVICE OF AN ANGLE FOR SUPPORTING MUSICAL INSTRUMENTS AND A DEVICE FOR SUPPORTING MUSICAL INSTRUMENTS HAVING THE SAME

(71) Applicant: Sakae Rhythm Musical Instrument Ltd., Osaka (JP)

(72) Inventors: Eizo Nakata, Osaka (JP); Shunsaku Tsuji, Tondabayashi (JP); Manabu Morioka, Nara (JP)

(73) Assignee: Sakae Rhythm Musical Instrument Ltd., Osaka-shi (JP)

(*) Notice: Subject to any disclaimer, the term of this patent is extended or adjusted under 35 U.S.C. 154(b) by 25 days.

(21) Appl. No.: 13/660,110

(22) Filed: Oct. 25, 2012

(65) Prior Publication Data

US 2014/0116230 A1 May 1, 2014

(51) Int. Cl.
*G10D 13/02* (2006.01)

(52) U.S. Cl.
CPC ................................. *G10D 13/026* (2013.01)
USPC ............................................................ 84/421

(58) Field of Classification Search
CPC ............................................ G10D 13/026
USPC ........................................................... 84/421
See application file for complete search history.

(56) References Cited

U.S. PATENT DOCUMENTS

| | | | | |
|---|---|---|---|---|
| 3,405,587 A | * | 10/1968 | Meazzi et al. | 84/421 |
| 3,704,645 A | * | 12/1972 | Grauso et al. | 84/421 |
| 4,363,561 A | * | 12/1982 | Hsieh | 403/92 |
| 4,747,569 A | * | 5/1988 | Hoshino | 248/291.1 |
| 5,309,811 A | * | 5/1994 | Hoshino | 84/421 |
| 5,756,912 A | * | 5/1998 | Liao | 84/421 |
| 5,803,642 A | * | 9/1998 | Sassmannshausen | 403/90 |
| 5,936,176 A | * | 8/1999 | Lombardi | 84/421 |
| 6,075,190 A | * | 6/2000 | Mosser et al. | 84/421 |
| 6,259,011 B1 | * | 7/2001 | Liao | 84/421 |
| 6,307,137 B1 | * | 10/2001 | Liao | 84/422.3 |
| 6,346,665 B1 | * | 2/2002 | Liao | 84/421 |
| 6,710,236 B2 | * | 3/2004 | Takegawa | 84/421 |
| 6,838,602 B2 | * | 1/2005 | Chang | 84/327 |
| 7,040,831 B2 | * | 5/2006 | Rapaport | 403/84 |
| 7,087,827 B2 | * | 8/2006 | Liao | 84/421 |
| 7,381,876 B2 | * | 6/2008 | Miyajima | 84/421 |
| 7,423,211 B2 | * | 9/2008 | Hsieh | 84/421 |
| 7,557,284 B2 | * | 7/2009 | Mori et al. | 84/421 |

* cited by examiner

*Primary Examiner* — Robert W Horn
(74) *Attorney, Agent, or Firm* — Kratz, Quintos & Hanson, LLP (57) ABSTRACT

To provide a musical instrument holding angle adjusting apparatus and a musical instrument holder including the same, which involve small number of components and which are simply structured. With the musical instrument holding angle adjusting apparatus, not only the top to bottom tilt angle but also the axial rotation angle can be adjusted, and excellent operability is exhibited. Even more, excellent durability is exhibited without incurring impairment of the function even through a long period of use. Further, the tilt angle and the rotation angle having undergone adjustment and setting can be retained with a strong force.

12 Claims, 10 Drawing Sheets

ADJUSTMENT DEVICE OF AN ANGLE FOR SUPPORTING MUSICAL INSTRUMENTS AND A DEVICE FOR SUPPORTING MUSICAL INSTRUMENTS HAVING THE SAME

BACKGROUND OF THE INVENTION

1. Field of the Invention

The present invention relates to a musical instrument holding angle adjusting apparatus suitable for holding percussion instruments such as cymbals, tom-toms, snare drums, and the like, and a musical instrument holder including the same.

2. Description of the Background Art

As a holding angle adjusting apparatus of this kind, what is conventionally proposed is, for example, an apparatus including: a fixed member, a movable member, and a plurality of friction plates alternately stacked between the fixed member and the movable member. Pressing members for pressing the nails of corresponding friction plates against the inner face of notches formed at respective members are provided. Each pressing member is fixed to the fixed member and the movable member along a direction substantially parallel to the axis of the rotary shaft. The corresponding friction plates are fixed in a state that the friction plates are interposed under pressure between inside wall surfaces of the notches and the pressing members (e.g., see Japanese Unexamined Patent Application No. 2006-154716). However, with this adjusting apparatus, though the top to bottom tilt angle of the movable member can be adjusted, the axial rotation angle cannot be adjusted.

On the other hand, particularly in connection with the holding angle adjusting apparatus used as the musical instrument holder such as a tom-holder, what is conventionally proposed is an apparatus including: a ball member held so as to be capable of swivel in a unit body, and a holding bar slidably inserted into a hole of the ball member, in which a side drum is held by the holding bar (e.g., see Japanese Unexamined Patent Application No. 2007-79437, U.S. Pat. No. 5,804,747, and United States Application No. 2005-0172782). With such an adjusting apparatus, the attitude of the holding bar can be adjusted relatively freely. However, the ball member is normally made of synthetic resin so that it can be fixed at a prescribed angle by frictional force. Therefore, through a long period of use, the ball may deform and the initially expected frictional press-attaching force may not be exhibited. Further, though it is possible to allow the holding bar inserted into the ball member to axially rotate, the ball member does not exhibit full attaching force for preventing the rotation moment applied to the holding bar of a relatively small diameter, and the operability is also reduced. Therefore, such an axial rotation is not preferable in terms of design.

Accordingly, taking into consideration of the circumstances described above, the present invention is directed to provide a musical instrument holding angle adjusting apparatus and a musical instrument holder including the same, which require smaller number of components and are simply structured. Further, with the musical instrument holding angle adjusting apparatus and the musical instrument holder including the same, not only the top to bottom tilt angle but also the axial rotation angle can be adjusted and excellent operability is exhibited. Still further, the function is not impaired even through a long period of use, and excellent durability is exhibited. Still further, the adjusted and set tilt angle and the rotation angle can be maintained with strong force.

SUMMARY OF THE INVENTION

In order to solve the problems described above, the present invention provides a musical instrument holding angle adjusting apparatus, including:

a holding rod; and a clamping element that supports the holding rod so as to be axially rotatable and tiltable upward and downward, wherein the musical instrument holding angle adjusting apparatus adjusting a holding angle of a musical instrument held on one of the holding rod side and the clamping element side, and an increased diameter portion having an outer circumferential surface greater in diameter than the holding rod is provided at an outer circumferential portion on a base end side of the holding rod, wherein the clamping element includes:

paired movable blocks arranged above and below the increased diameter portion of the holding rod to axially rotatably receive the holding rod;

a tightening collar including a substantially C-shaped ring portion as seen sideways, the ring portion being externally attached to each of the paired movable blocks to receive the movable blocks rotatably about an axis being perpendicular to the axis of the holding rod; and diameter reducing means for reducing a diameter of the ring portion of the tightening collar, wherein by the diameter reducing means reducing the diameter of the ring portion, the paired movable blocks become incapable of rotating in a state clamping the increased diameter portion of the holding rod, whereby a top to bottom tilt angle and an axial rotation angle of the holding rod are fixed.

Here, preferably, the outer circumferential surface of the increased diameter portion is provided with a tapered portion along which a diameter is increased or reduced in an axial direction of the holding rod, and a tapered groove being substantially parallel to the tapered portion is provided to each of sites on respective opposing inner side faces of the paired movable blocks, the sites facing the increased diameter portion.

Further, preferably, the tightening collar is arranged on each of opposite end sides in a rotary axial direction on outer circumferential surfaces of the paired movable blocks.

Still further, preferably, the diameter reducing means is pressing means that presses other end side of the ring portion in a circumferential direction to reduce the diameter of the ring portion, the ring portion having its one end side fixed or engaging-stopped to prevent rotation.

Still further, the present invention also provides a musical instrument holder including the musical instrument holding angle adjusting apparatus described above.

With the musical instrument holding angle adjusting apparatus and the musical instrument holder including the holding angle adjusting apparatus of the present invention, in the state where the diameter reducing means is loosened, the top to bottom tilt angle or the rotation angle of the holding rod is adjusted and set. In this state, the diameter reducing means reduces the diameter of the ring portion. Thus, the paired movable blocks become incapable of rotating in the state clamping the increased diameter portion of the holding rod, whereby the top to bottom tilt angle and the axial rotation angle of the holding rod are fixed, and it becomes possible to adjust the holding angle of the musical instrument fixed on the holding rod side or the clamping element side. In this manner, since the top to bottom tilt angle and the axial rotation angle of the holding rod can simultaneously be adjusted and fixed just by operating the diameter reducing means, excellent operability is exhibited. Further, since the increased diameter portion is clamped and fixed by the movable blocks, the clamped contact area becomes great. Therefore, even when great rotation moment acts because of the weight or usage of the musical instrument, the axial rotation of the holding rod can more surely be prevented. When the angles are adjusted, the clamping force preventing the axial rotation mildly changes because of the increased contact area. Hence, the operability is also significantly improved.

Further, the outer circumferential surface of the increased diameter portion is provided with a tapered portion along which a diameter is increased or reduced in an axial direction of the holding rod, and a tapered groove being substantially parallel to the tapered portion is provided to each of sites on respective opposing inner side faces of the paired movable blocks, the sites facing the increased diameter portion. Therefore, when the increased diameter portion of the holding rod is clamped by the movable blocks, the clamping force acting on the movable blocks acts as a force increased by the wedge effect to the outer circumferential surface of the increased diameter portion. By the increased clamping force, the increased diameter portion can strongly be clamped.

Still further, the tightening collar is arranged on each of opposite end sides in a rotary axial direction on outer circumferential surfaces of the paired movable blocks. Therefore, the concave groove for the tightening collar can be formed while avoiding the position of the holding rod having the increased diameter portion. Thus, an increase in both the thickness and outer dimension of the movable blocks attributed to the provision of the increased diameter portion can be suppressed to a minimum, and a reduction in the weight and size of the apparatus can be achieved.

Still further, the diameter reducing means is pressing means that presses other end side of the ring portion in a circumferential direction to reduce the diameter of the ring portion, the ring portion having its one end side fixed or engaging-stopped to prevent rotation. Therefore, despite the simple structure, the entire ring portion inner face can be pressed against the movable blocks, and the increased diameter portion can more surely and strongly be clamped by the movable blocks. In addition, the movable blocks can be strongly supported so as to be incapable of rotating.

DESCRIPTION OF THE PREFERRED EMBODIMENTS

Next, with reference to the accompanying drawings, a detailed description will be given of an embodiment of the present invention.

Figure 1:
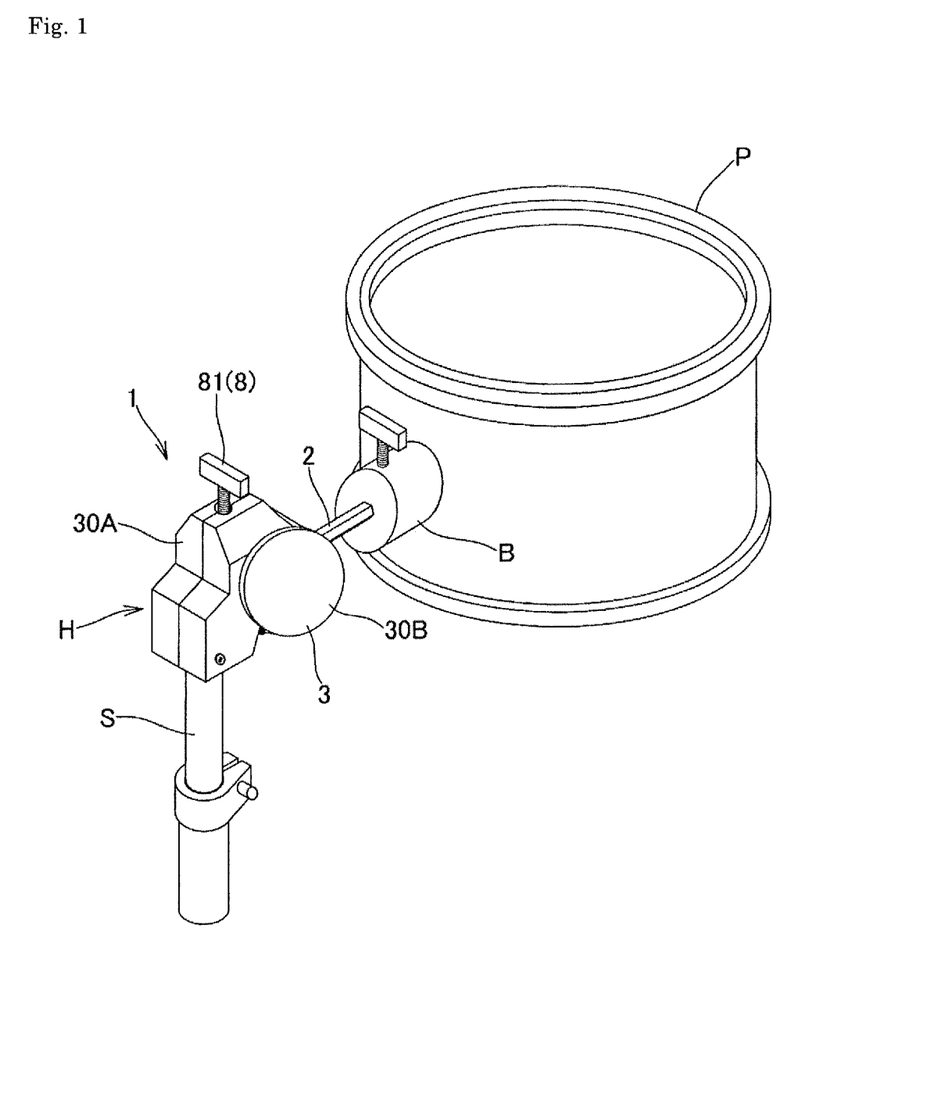
FIG. 1 is a perspective view showing a musical instrument holder having a holding angle adjusting apparatus according to a representative embodiment of the present invention.
Figure 2:
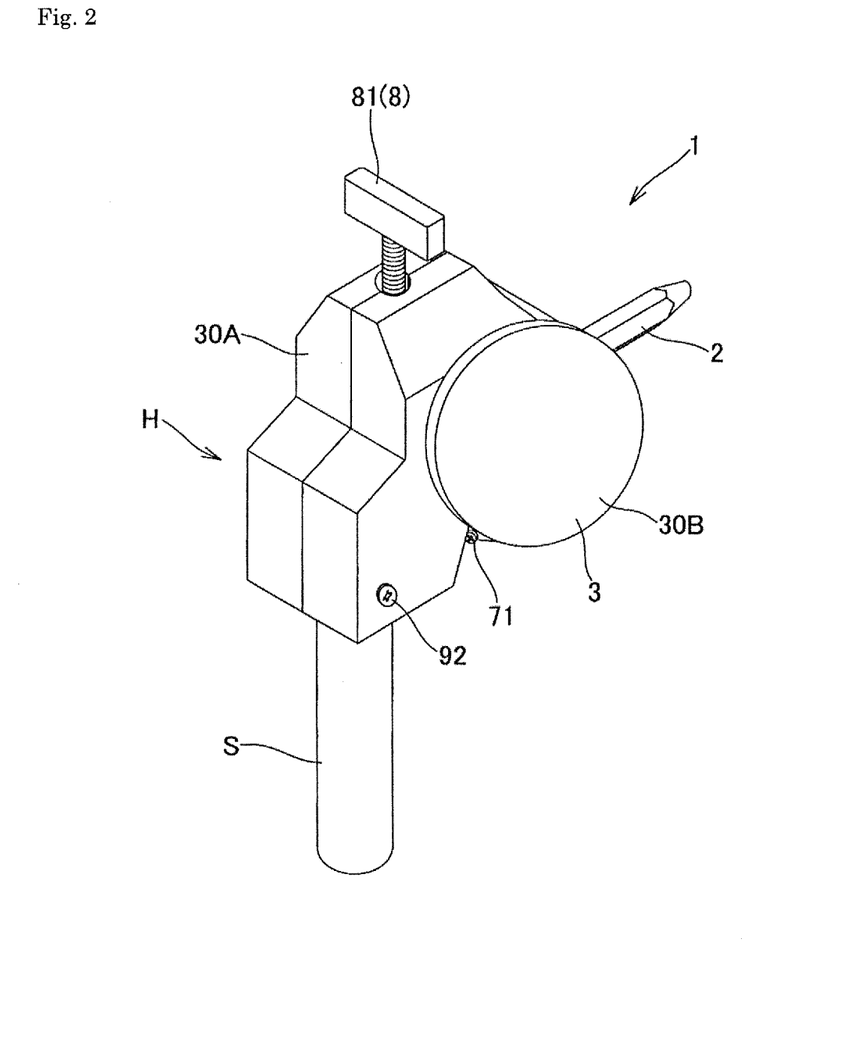
FIG. 2 is a perspective view showing the holding angle adjusting apparatus according to the representative embodiment of the present invention.

As shown in FIGS. 1 and 2, a musical instrument holding angle adjusting apparatus 1 of the present invention includes a holding shaft 2 being a holding rod, and a clamping element 3 that supports the holding shaft 2 so as to be axially rotatable and tiltable upward and downward. The musical instrument holding angle adjusting apparatus 1 is an apparatus that adjusts the holding angle of a musical instrument P fixed on the holding shaft 2 side. In the present embodiment, a musical instrument holder H (tom-holder) is structured as follows: the clamping element 3 of the holding angle adjusting apparatus 1 is provided with a holding pipe S extending downward; the holding pipe S is attached to a base on the bass drum side, which is not shown; and the holding shaft 2 is attached to a bracket B on the musical instrument P (tom-tom) side.

In connection with the musical instrument holder H according to the present embodiment, in addition to the foregoing manner in which the musical instrument P is fixed on the side of the holding shaft 2 of the holding angle adjusting apparatus 1, it is also possible to fix the musical instrument on the opposite clamping element 3 side, and to fix the holding shaft 2 side to a stand or the like. Further, in addition to the manner in which the holding pipe S is attached to the base on the bass drum side, it is also preferable to attach the holding pipe S to other musical instrument, a stand, and the like. The musical instrument P held by the musical instrument holder H of the present invention preferably includes, in addition to the tom-tom, percussion instruments such as cymbals, a snare drum, and the like.

Figure 3:
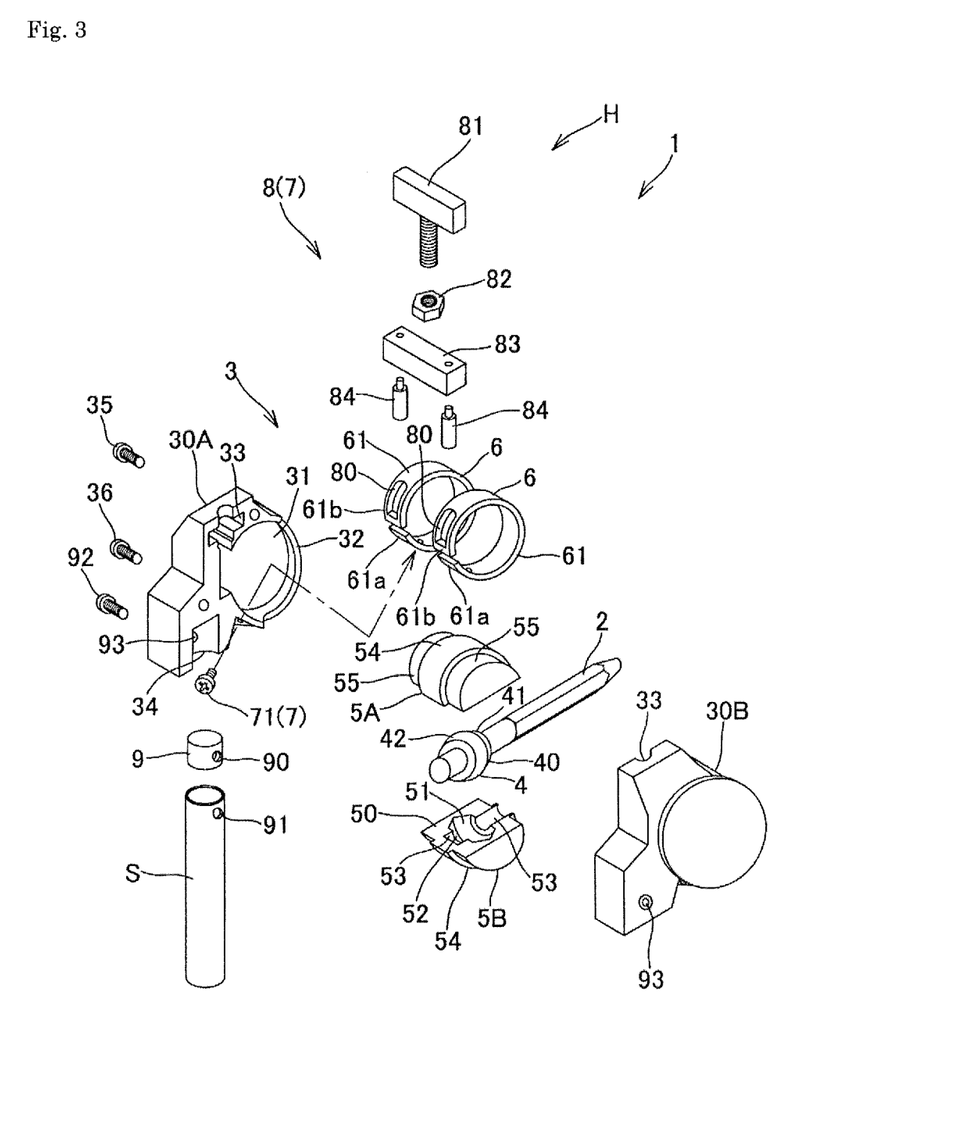
FIG. 3 is an exploded perspective view showing the holding angle adjusting apparatus according to the representative embodiment of the present invention.
Figure 4:
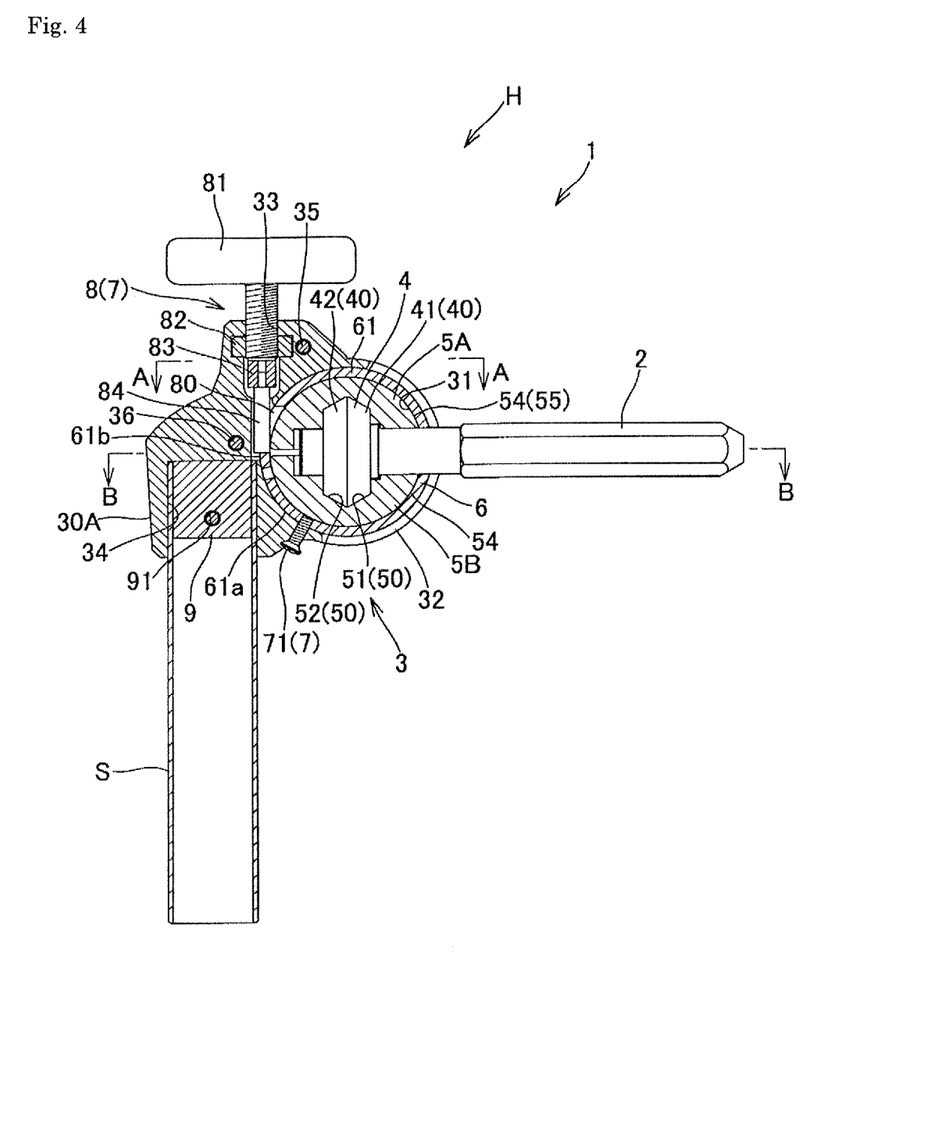
FIG. 4 is a vertical cross-sectional view showing the holding angle adjusting apparatus according to the representative embodiment of the present invention.
Figure 5:
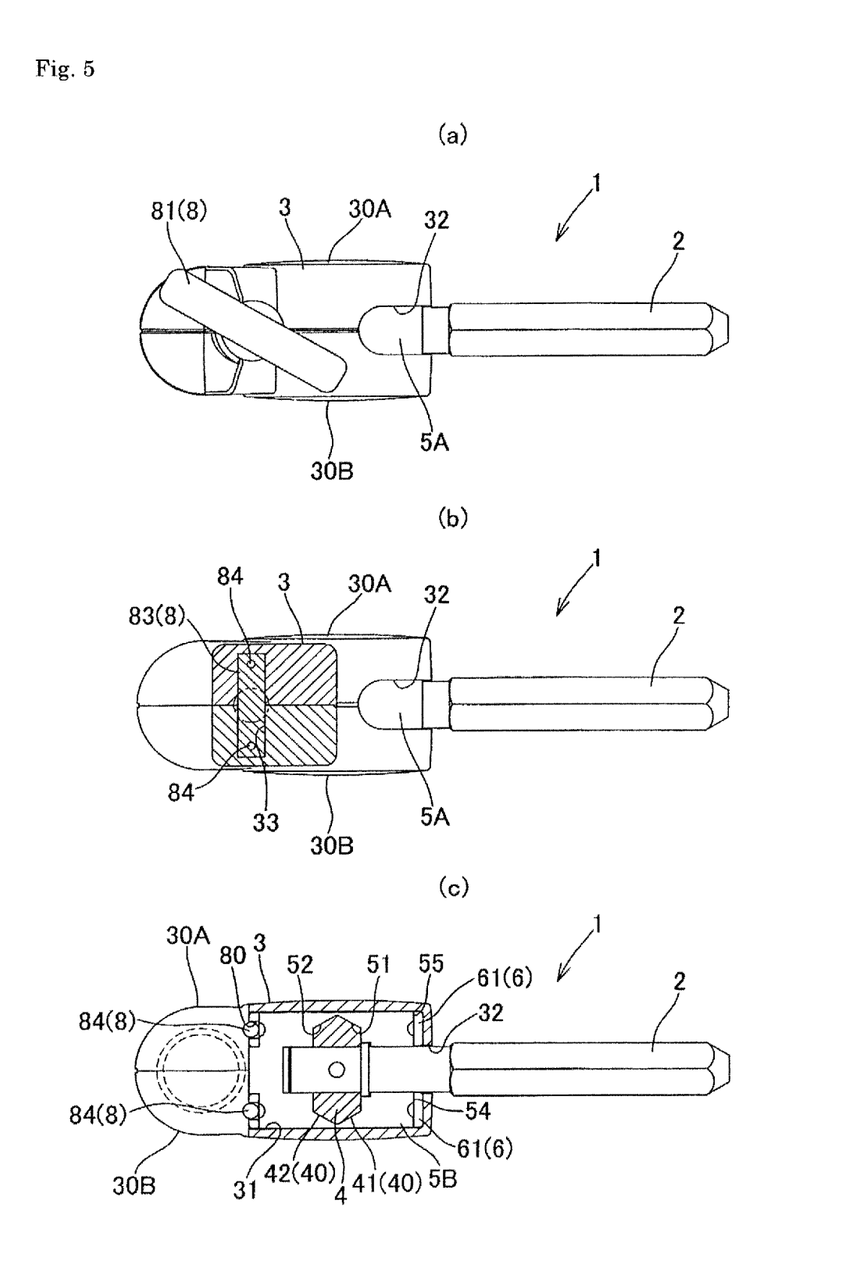
FIG. 5A is a plan view showing the holding angle adjusting apparatus according to the representative embodiment of the present invention.
FIG. 5B is a horizontal cross-sectional view of the holding angle adjusting apparatus taken along A-A in FIG. 4.
FIG. 5C is a horizontal cross-sectional view of the holding angle adjusting apparatus taken along B-B in FIG. 4.
Figure 6:
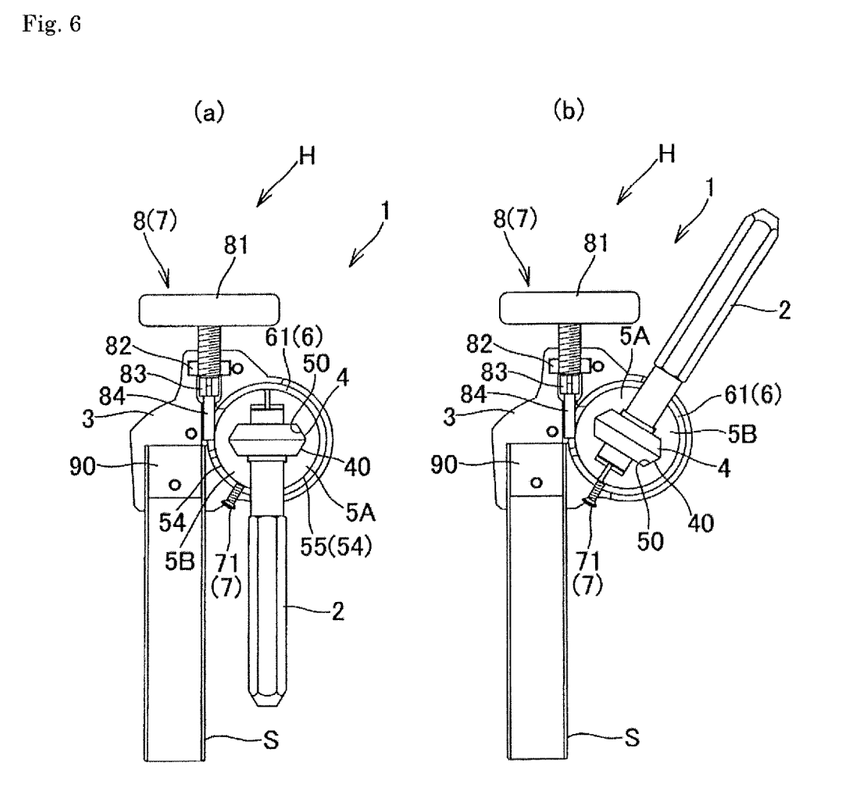
FIGS. 6A and 6B are each an explanatory view showing the manner in which a tilt angle of a holding shaft is varied.

As shown in FIGS. 3 to 5, in the holding angle adjusting apparatus 1, the holding shaft 2 includes an increased diameter portion 4 at its outer circumferential portion on the base end side. The increased diameter portion 4 has an outer circumferential surface whose diameter is greater than that of the shaft 2. Further, the clamping element 3 includes paired movable blocks 5A and 5B arranged above and below the increased diameter portion 4 of the holding shaft 2 to receive the holding shaft 2 axially rotatably. The clamping element 3 further includes tightening collars 6 including ring portions 61 which are substantially C-shaped as seen sideways, the ring portions 61 being externally attached to the paired movable blocks 5A and 5B, to receive the movable blocks 5A and 5B rotatably about an axis being perpendicular to the axis of the holding shaft 2. The clamping element 3 further includes diameter reducing means 7 which reduces the diameter of the ring portions 61 of the tightening collars 6.

In connection with the holding angle adjusting apparatus 1 structured as described above, in the state where the diameter reducing means 7 is loosened, the top to bottom tilt angle and the rotation angle of the holding shaft 2 are set. In this state, the diameter of the ring portions 61 is reduced by the diameter reducing means 7. Then, the paired movable blocks 5A and 5B become incapable of rotating while clamping the increased diameter portion 4 of the holding shaft 2. Thus, the top to bottom tilt angle and axial rotation angle of the holding shaft 2 are fixed, and the holding angle of the musical instrument P fixed on the holding shaft 2 side or the clamping element 3 side can be adjusted.

Figure 7:
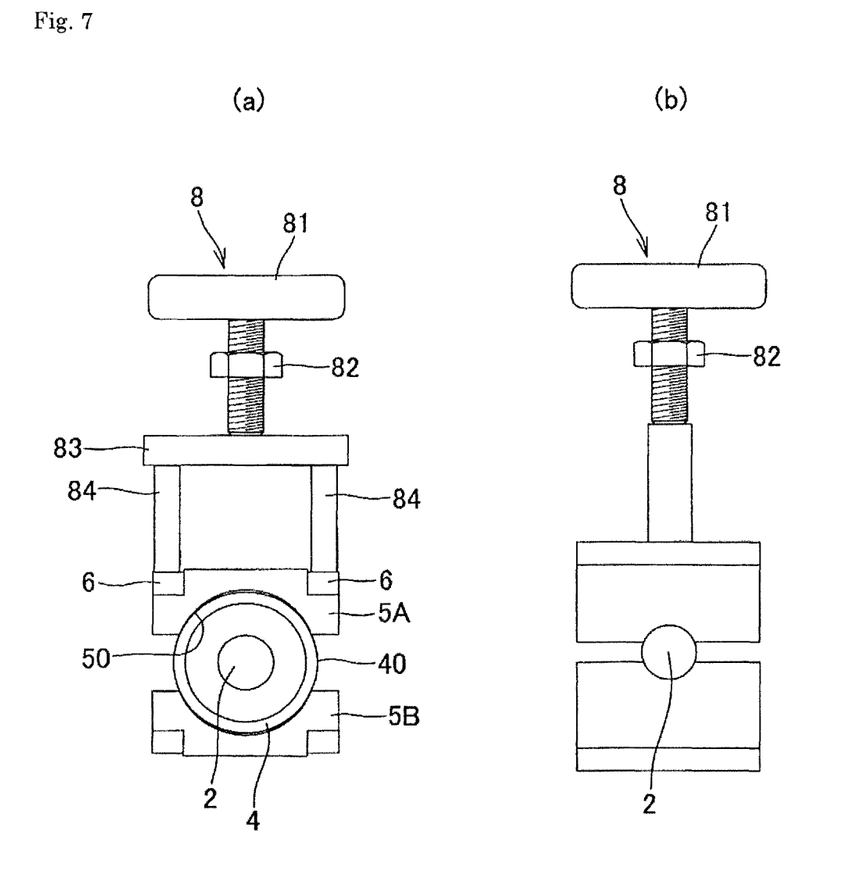
FIGS. 7A and 7B are each a conceptual view for describing the effect of the clamping force of movable blocks.

Thus, by the operation of the diameter reducing means 7, both the top to bottom tilt angle and the axial rotation angle of the holding shaft 2 can simultaneously be adjusted and fixed. Accordingly, excellent operability is obtained. As shown in FIGS. 7A and 7B, since the increased diameter portion 4 of the holding shaft is clamped and fixed by the movable blocks 5A and 5B, the contact area involved with clamping becomes great. Therefore, even when great rotation moment acts because of the weight or use of the musical instrument, the axial rotation of the holding shaft 2 can more surely be prevented. Further, in adjusting the angles, the clamping force stopping the axial rotation mildly varies because of the increase in the contact area. Hence, the operability thereof is also significantly improved.

Figure 8:
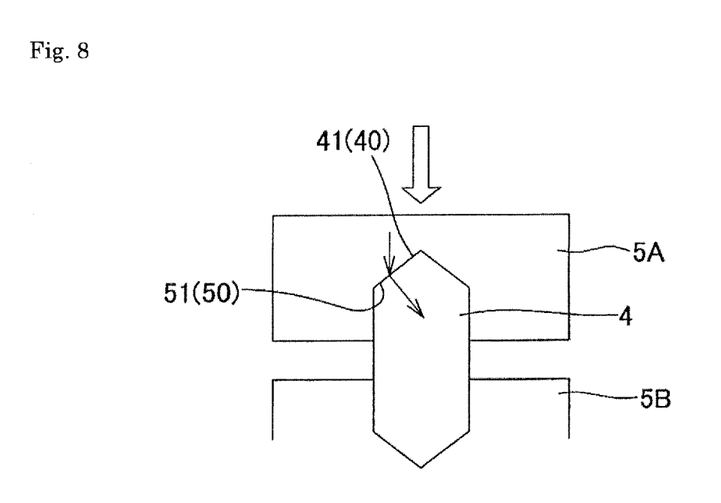
FIG. 8 is a conceptual view for describing the effect of the clamping force of the movable blocks.

Though the holding shaft is a solid metal shaft, the holding rod may be in any other mode such as pipe-like shape. Further, the material may be, in addition to metal, various materials such as resin or ceramics. Further, at the outer circumferential surface 40 of the increased diameter portion 4, tapered portions 41 and 42 along which the diameter increases or reduces in the axial direction of the holding shaft 2 are provided. At the sites of the inner side faces 50 of the movable blocks 5A and 5B facing the tapered portions 41 and 42, tapered grooves 51 and 52 being substantially parallel to the tapered portions 41 and 42 are provided. Accordingly, as described above, when the increased diameter portion 4 of the holding shaft is clamped by the movable blocks 5A and 5B, as shown in FIG. 8, the clamping force P1 acting on the movable block 5A (5B) acts as a force (P2) increased by the wedge effect to the outer circumferential surface 40 of the increased diameter portion 4, and the increased diameter portion 4 is strongly clamped by the increased clamping force.

In the present embodiment, the diameter of the outer circumferential surface 40 is the greatest at the axially central position, and the tapered portions 41 and 42 along which the diameter is gradually reduced toward the opposite end portions are provided. However, various structures can be employed for achieving the wedge effect, such as: the structure in which the central position is conversely small in diameter and in which tapered portions along which the diameter is increased toward the opposite end portions are provided; and at least one tapered portion along which the diameter increases from the one end side toward the other end side in the axial direction is provided. Further, a structure in which a straight part is partially formed in the tapered portion may naturally be employed. As to the tapered portions, in addition to the shape in which the diameter is increased or reduced by a constant rate, the structure in which the increase rate or the reduction rate is gradually changed is also a preferable embodiment.

The increased diameter portion 4 may be structured separately from the holding shaft 2 and caulked or fixed by screws to the base end side of the holding shaft 2, or it may be molded integrally with the holding shaft 2. In the present embodiment, the increased diameter portion 4 separately structured by metal softer than the holding shaft 2, preferably brass, is fixed to the base end side of the holding shaft 2. By employing the increased diameter portion 4 made of relatively soft metal, the clamping force attributed to friction with the movable block is increased. In place of metal, it is also preferable to employ hard synthetic resin as the material.

The movable blocks 5A and 5B are halved members of substantially identical shape, each having the following at the inner side faces 50 opposing to each other: tapered grooves 51 and 52 receiving and clamping the increased diameter portion 4 of the holding shaft 2; and a straight groove 53 receiving the shaft portion of the holding shaft 2 except for the increased diameter portion 4. The outer shape of the movable blocks 5A and 5B is a partially circular columnar shape, obtained by cutting a substantially circular columnar shape along a plane parallel to the axis thereof. It is to be noted that the outer circumferential portion of each movable block is not limited to the partially circular columnar round side face shape. So long as the site to which each tightening collar 6 rotatably receiving the movable block is attached has the round circumferential face, the other site may be structured to be a prism-manner side face shape, or the like, for example.

The tightening collars 6 are each a metal-made plate-like elastic ring curved in a C-shape. The tightening collars 6 are each arranged at the end portions in the axial direction of the outer circumferential surface 54 in the partially circular columnar shape of the paired movable blocks 5A and 5B. On the opposite end portions of the movable blocks 5A and 5B, annular concave grooves 55 and 55 are provided. To the annular concave grooves 55 and 55, the ring portions 61 of the tightening collars 6 are attached. By the two tightening collars 6 in total, the movable blocks 5A and 5B are rotatably received. It is to be noted that, the tightening collar 6 may be structured to have wide width and may be one in number in total. Alternatively, three or more tightening collars 6 may naturally be attached. However, employing the structure of the present embodiment in which the tightening collars 6 are arranged on the opposite ends of the movable blocks 5A and 5B, the concave grooves 55 and 55 for the tightening collars 6 can be formed at the position except for the position where the holding shaft 2 having the increased diameter portion 4 is located. Thus, the great thickness and outer dimension of the movable blocks attributed to provision of the increased diameter portion 4 can be suppressed to a minimum.

The increased diameter portion 4 of the holding shaft 2, the movable blocks 5A and 5B, and the tightening collars 6 and 6 are attached in a clamp case 30. The clamp case 30 is structured by assembling symmetrical separate cases 30A and 30B by fixing screws 35 and 36. The separate cases are each provided with a storage space 31 storing the increased diameter portion 4, the movable blocks 5A and 5B, and the tightening collars 6, cutout grooves 32 for allowing the holding shaft 2 to extend so as to be tilted upward and downward, and a storage space 33 for storing pressing means 8, which will be described later, the storage space 33 communicating with the storage space 31. In the present embodiment, the separate cases are further provided with attachment grooves 34 for attaching the holding pipe S, which extends downward, to the clamping element 3. It goes without saying that, asymmetric separate cases which form such a space when being combined may be employed.

Each tightening collar 6 stored in the storage space 31 of the separate cases has its one end side 61a screwed with a fixing screw 71 which externally penetrates the inner wall of the space, and thus the tightening collar 6 is fixed to the inner wall. The other end side 61b is pressed in the radial direction by the pressing means 8 attached to the storage space 33 communicating with the storage space 31. Thus, the tightening collars 6 have their diameter reduced, to clamp the movable blocks 5A and 5B. That is, the fixing screws 71 and the pressing means 8 structure the diameter reducing means 7 reducing the ring portion 61 of each tightening collar 6.

The pressing means 8 is structured by: a joint key 81 having an operational piece on an upper part of a male screw portion; a nut 82 being engaging-stopped to be incapable of rotating in the storage space 33; a horizontally elongated substantially cubic shape fix block 83 being pressed down by the tip portion of the male screw portion of the joint key 81; and pushpins 84 provided to project at the positions corresponding to the tightening collars 6 on the right and left opposite portions of the fix block. The tip faces of the pushpins 84 are engaging-stopped by engagement grooves 80 formed on other end sides 61b of the tightening collars 6. In this state, by tightening the joint key 81, the other end sides 61b are pressed. It is to be noted that, instead of provision of the nut 82, a female screw portion may be formed on the case side. Further, the fix block and the pushpins may integrally be molded.

Figure 9:
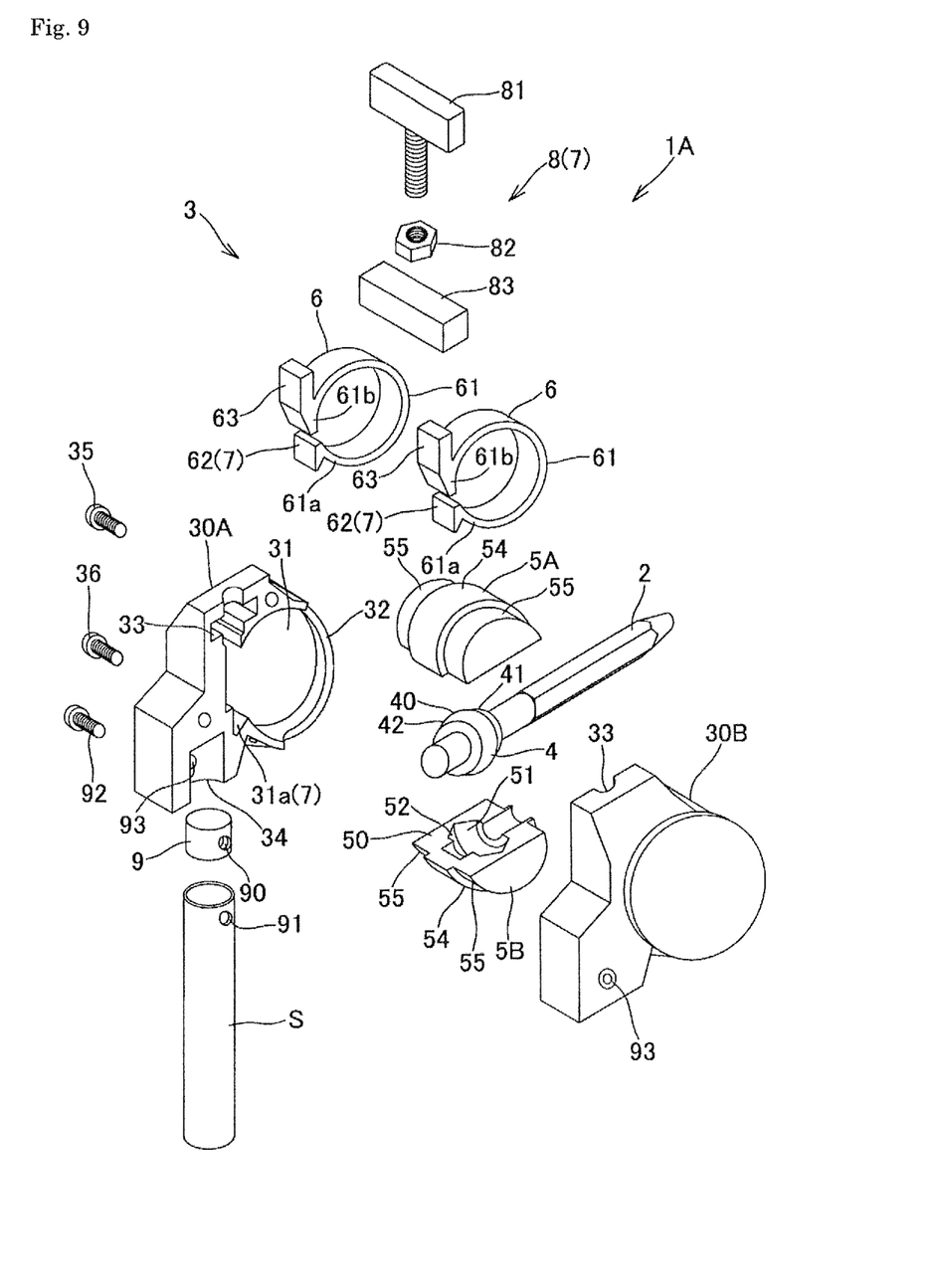
FIG. 9 is an exploded perspective view showing a variation of the holding angle adjusting apparatus of the present invention.
Figure 10:
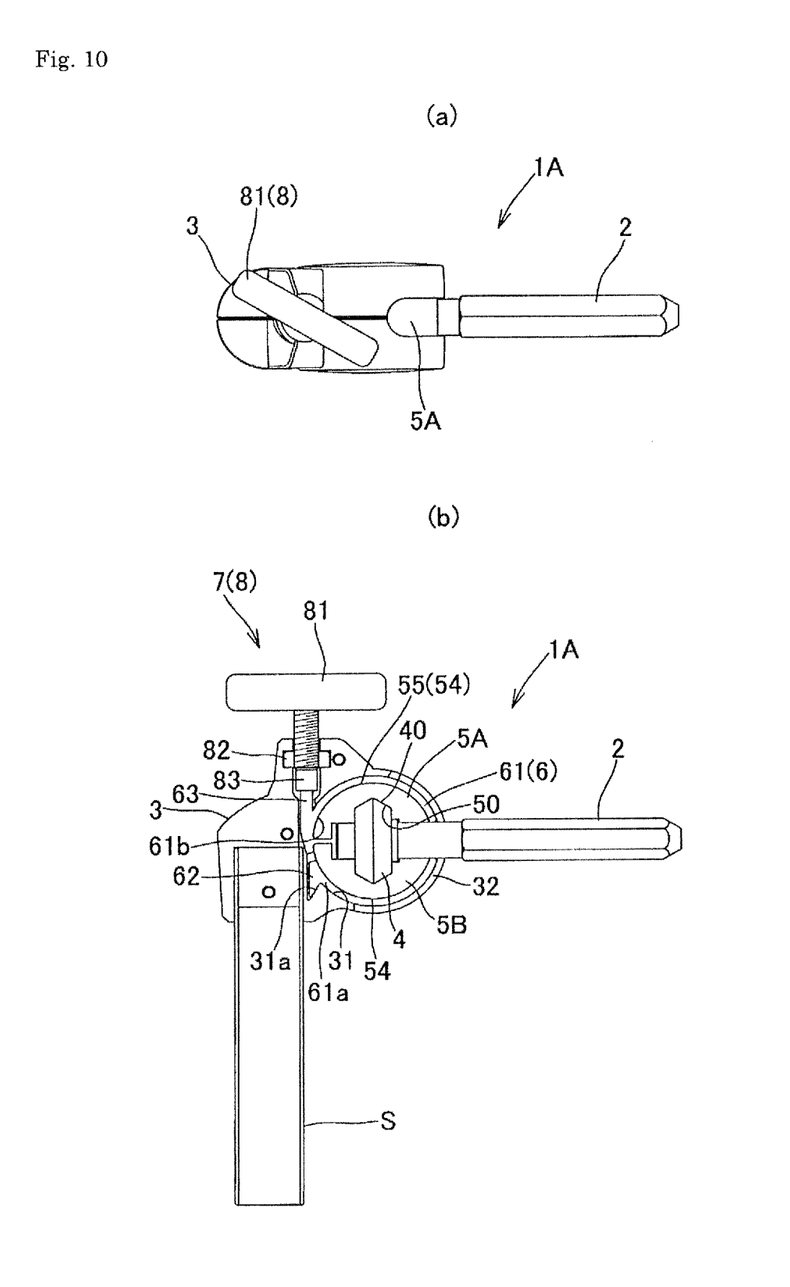
FIG. 10A is a plan view showing the variation of the holding angle adjusting apparatus of the present invention.
FIG. 10B is a vertical cross-sectional view showing the variation of the holding angle adjusting apparatus of the present invention.

FIGS. 9 and 10 are each an explanatory view showing a variation of the diameter reducing means 7. In the present embodiment, the tightening collars 6 are each provided with, at the outer surface of the one end side of the ring portion 61, a projecting engaging-stopper piece 62 which is engaging-stopped by the engagement groove 31a formed at the inner circumferential surface of the storage space 31. The engaging-stopper pieces 62 prevent one end sides of the ring portions 61 from rotating. Similarly, at the other end side of each tightening collar 6, a projecting press-receiving piece 63 which is directly pressed downward by the fix block 83 is provided. Thus, the pushpins 84 and the fixing screws 71 are eliminated. Because of a reduction in the number of components, the material cost, the assembling cost, and the like are greatly reduced. Further, elimination of the fixing screws 71 contributes toward an improvement in appearance. In addition thereto, in place of the screw type pressing means made up of the joint key 81 and the nut 82, a lever type mechanism or the like may be employed.

The holding pipe S is inserted into the attachment grooves 34 of the clamp case in the state where a fix collar 9 provided with screw hole 90 on each of the right and left side walls is inserted. From the outside of the case, a fixing screw 92 penetrating through a through hole 93 and a through hole 91 of the holding pipe S is screwed with the screw hole 90. Thus, the holding pipe S is fixed to the attachment grooves 34. It is to be noted that, as to the material of the movable blocks, the tightening collars, the pushpins, the fix block, the clamp case, and the like also, in addition to metal, various materials such as synthetic resin, ceramics, and the like may be employed.

In the foregoing, a description has been given of the embodiment of the present invention. However, the present invention is not limited to the embodiment. It goes without saying that the present invention can be practiced in various modes within a range not departing from the gist of the present invention.

REFERENCE SIGNS LIST

1 Holding angle adjusting apparatus
2 Holding shaft
3 Clamping element
4 Increased diameter portion
5A, 5B Movable block
6 Tightening collar
7 Diameter reducing means
8 Pressing means
9 Fix collar
30 Clamp case
30A, 30B Separate case
31 Storage space
31a Engagement groove
32 Cutout groove
33 Storage space
34 Attachment groove
35 Fixing screw
40 Outer circumferential surface
41 Tapered portion
50 Inner side face
51 Tapered groove
53 Groove
54 Outer circumferential surface
55 Concave groove
61 Ring portion
61a One end side
61b Other end side
62 Engaging-stopper piece
63 Press-receiving piece
71 Fixing screw
80 Engagement groove
81 Joint key
82 Nut
83 Fix block
84 Pushpin
90 Screw hole
91 Through hole
92 Fixing screw
93 Through hole
B Bracket
H Musical instrument holder
P Musical instrument
S Holding pipe

What is claimed is:

1. A musical instrument holding angle adjusting apparatus, comprising:
   a holding rod; and
   a clamping element that supports the holding rod so as to be axially rotatable and tiltable upward and downward, wherein
   the musical instrument holding angle adjusting apparatus adjusting a holding angle of a musical instrument held on one of the holding rod side and the clamping element side, and
   an increased diameter portion having an outer circumferential surface greater in diameter than the holding rod is provided at an outer circumferential portion on a base end side of the holding rod, wherein
   the clamping element includes:
   paired movable blocks arranged above and below the increased diameter portion of the holding rod to axially and rotatably receive the holding rod;
   a tightening collar including a substantially C-shaped ring portion as seen sideways, the ring portion being externally attached to each of the paired movable blocks to receive the movable blocks rotatably about an axis being perpendicular to an axis of the holding rod; and
   diameter reducing means for reducing a diameter of the ring portion of the tightening collar, wherein
   by the diameter reducing means reducing the diameter of the ring portion, the paired movable blocks become incapable of rotating in a state clamping the increased, diameter portion of the holding rod, whereby a top to bottom tilt angle and an axial rotation angle of the holding rod are fixed.

2. The musical instrument holding angle adjusting apparatus according to claim 1, wherein the outer circumferential surface of the increased diameter portion is provided with a tapered portion along which a diameter is increased or reduced in an axial direction of the holding rod, and a tapered groove being substantially parallel to the tapered portion is provided to each of sites on respective opposing inner side faces of the paired movable blocks, the sites facing the increased diameter portion.

3. The musical instrument holding angle adjusting apparatus according to claim 1, wherein the tightening collar is arranged on each of opposite end sides in a rotary axial direction on outer circumferential surfaces of the paired movable blocks.

4. The musical instrument holding angle adjusting apparatus according to claim 1, wherein the diameter reducing means is pressing means that presses other end side of the ring portion in a circumferential direction to reduce the diameter of the ring portion, the ring portion having its one end side fixed or engaging-stopped to prevent rotation.

5. A musical instrument holder comprising the holding angle adjusting apparatus according to claim 1.

6. The musical instrument holding angle adjusting apparatus according to claim 2, wherein the tightening collar is arranged on each of opposite end sides in a rotary axial direction on outer circumferential surfaces of the paired movable blocks.

7. The musical instrument holding angle adjusting apparatus according to claim 2, wherein the diameter reducing means is pressing means that presses other end side of the ring portion in a circumferential direction to reduce the diameter of the ring portion, the ring portion having its one end side fixed or engaging-stopped to prevent rotation.

8. The musical instrument holding angle adjusting apparatus according to claim 6, wherein the diameter reducing means is pressing means that presses other end side of the ring portion in a circumferential direction to reduce the diameter of the ring portion, the ring portion having its one end side fixed or engaging-stopped to prevent rotation.

9. A musical instrument holder comprising the holding angle adjusting apparatus according to claim 2.

10. A musical instrument holder comprising the holding angle adjusting apparatus according to claim 6.

11. A musical instrument holder comprising the holding angle adjusting apparatus according to claim 7.

12. A musical instrument holder comprising the holding angle adjusting apparatus according to claim 8.

* * * * *